US011007603B2

(12) United States Patent
Toyama et al.

(10) Patent No.: US 11,007,603 B2
(45) Date of Patent: May 18, 2021

(54) LASER BEAM MACHINE AND ALIGNMENT ADJUSTING METHOD

(71) Applicant: MAKINO MILLING MACHINE CO., LTD., Tokyo (JP)

(72) Inventors: Hiroshi Toyama, Aiko-gun (JP); Muneaki Beppu, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 910 days.

(21) Appl. No.: 15/547,257

(22) PCT Filed: Jan. 30, 2015

(86) PCT No.: PCT/JP2015/052755
§ 371 (c)(1),
(2) Date: Jul. 28, 2017

(87) PCT Pub. No.: WO2016/121116
PCT Pub. Date: Aug. 4, 2016

(65) Prior Publication Data
US 2018/0029159 A1  Feb. 1, 2018

(51) Int. Cl.
*B23K 26/042* (2014.01)
*B23K 26/146* (2014.01)
*B23K 26/03* (2006.01)

(52) U.S. Cl.
CPC ......... *B23K 26/042* (2015.10); *B23K 26/032* (2013.01); *B23K 26/146* (2015.10)

(58) Field of Classification Search
None
See application file for complete search history.

(56) References Cited

U.S. PATENT DOCUMENTS 4,324,972 A * 4/1982 Furrer .................... B23K 26/02
219/121.63
5,164,565 A * 11/1992 Addiego .............. B23K 26/032
219/121.6
(Continued)

FOREIGN PATENT DOCUMENTS

CN      1701899      11/2005
CN    102259236      11/2011
(Continued)

OTHER PUBLICATIONS

International Search Report dated Apr. 28, 2015, directed to International Application No. PCT/JP2015/052755; 2 pages.

*Primary Examiner* — Ibrahime A Abraham
*Assistant Examiner* — Gyounghyun Bae
(74) *Attorney, Agent, or Firm* — Morrison & Foerster LLP

(57) ABSTRACT

This laser processing machine, which processes a work piece mounted on a table by irradiating the work piece with a laser light, is provided with: an optical head having a nozzle that sprays a liquid to form a columnar liquid flow and introducing a laser light into the nozzle and shining said light; and an alignment adjustment device having a reflector that is disposed so as to face the optical head and reflects the laser light, and a light-shielding portion around the portion of the reflector that reflects the laser light, and adjusting the position or orientation of introduction of the laser light into the columnar liquid flow.

9 Claims, 13 Drawing Sheets

(56) References Cited

U.S. PATENT DOCUMENTS

| | | | | |
|---|---|---|---|---|
| 5,902,497 | A * | 5/1999 | Alber | B23K 26/146 219/121.63 |
| 5,938,954 | A * | 8/1999 | Onuma | B23K 26/1224 219/121.6 |
| 8,025,542 | B2 * | 9/2011 | Birrell | B23K 26/048 445/24 |
| 8,792,076 | B2 * | 7/2014 | Tannas, Jr. | G02F 1/1339 349/153 |
| 2005/0263507 | A1 | 12/2005 | Yamazaki et al. | |
| 2006/0065650 | A1 * | 3/2006 | Guo | B23K 26/144 219/121.84 |
| 2006/0086459 | A1 * | 4/2006 | Koga | B23K 26/40 156/345.19 |
| 2007/0020785 | A1 | 1/2007 | Bruland et al. | |
| 2007/0084839 | A1 * | 4/2007 | Zhang | B23K 26/146 219/121.84 |
| 2009/0050661 | A1 * | 2/2009 | Na | C03B 33/091 225/2 |
| 2010/0078768 | A1 | 4/2010 | Dydyk et al. | |
| 2011/0042362 | A1 * | 2/2011 | Maehara | B23K 26/146 219/121.67 |
| 2012/0261393 | A1 * | 10/2012 | Nowotny | B23K 26/144 219/121.63 |
| 2012/0275174 | A1 * | 11/2012 | Takahashi | H01S 5/005 362/487 |
| 2014/0048519 | A1 * | 2/2014 | Gadd | B23K 26/364 219/121.68 |
| 2014/0251964 | A1 * | 9/2014 | Rowlette | H01S 3/139 219/121.81 |
| 2015/0165553 | A1 * | 6/2015 | Gaebelein | B23K 26/389 219/121.84 |

FOREIGN PATENT DOCUMENTS

| | | |
|---|---|---|
| JP | 59-19093 | 1/1984 |
| JP | 2009-262163 | 11/2009 |
| JP | 2011-235347 | 11/2011 |
| JP | 2012-110945 | 6/2012 |
| JP | 2013-91081 | 5/2013 |

* cited by examiner

FIG. 2
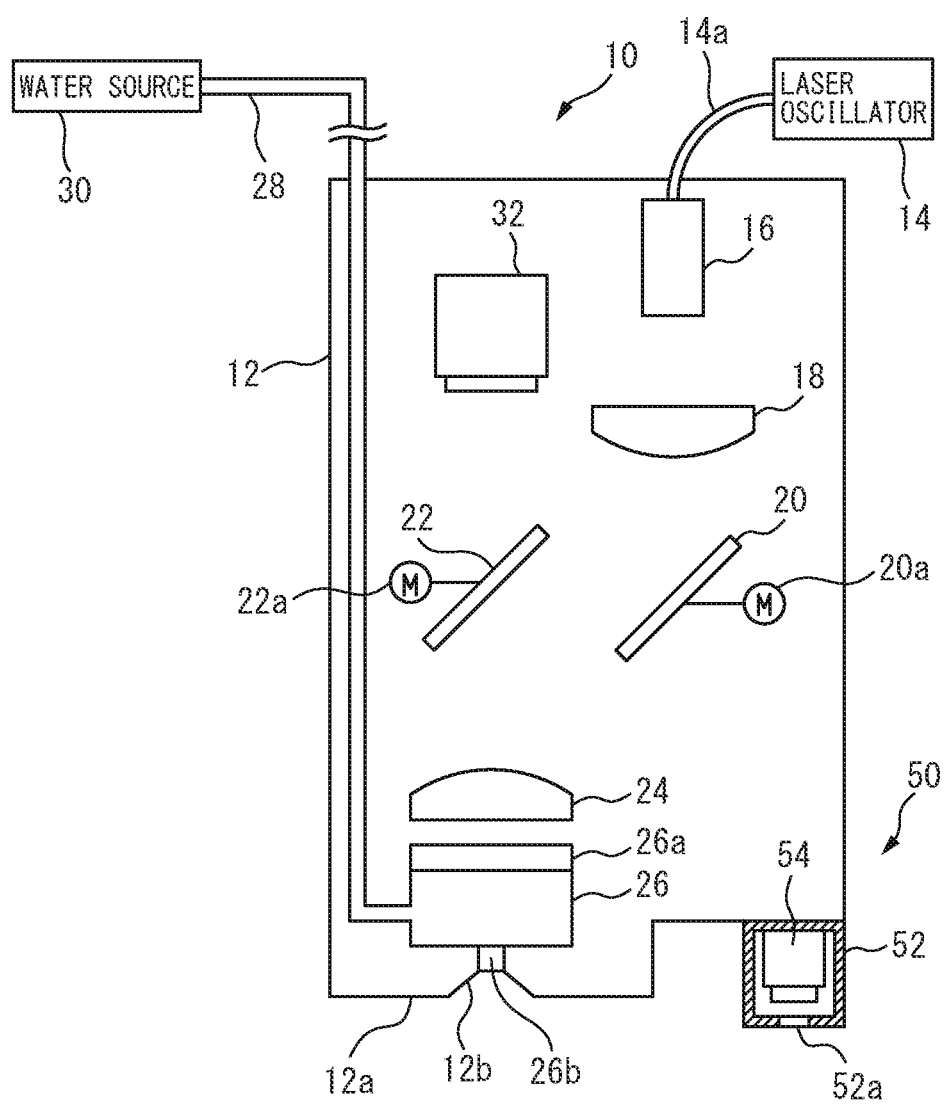
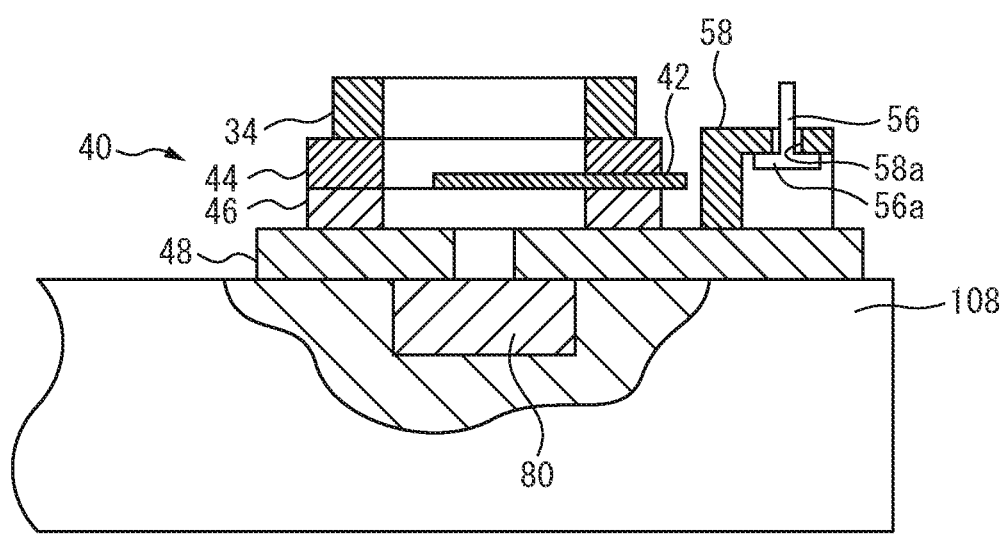

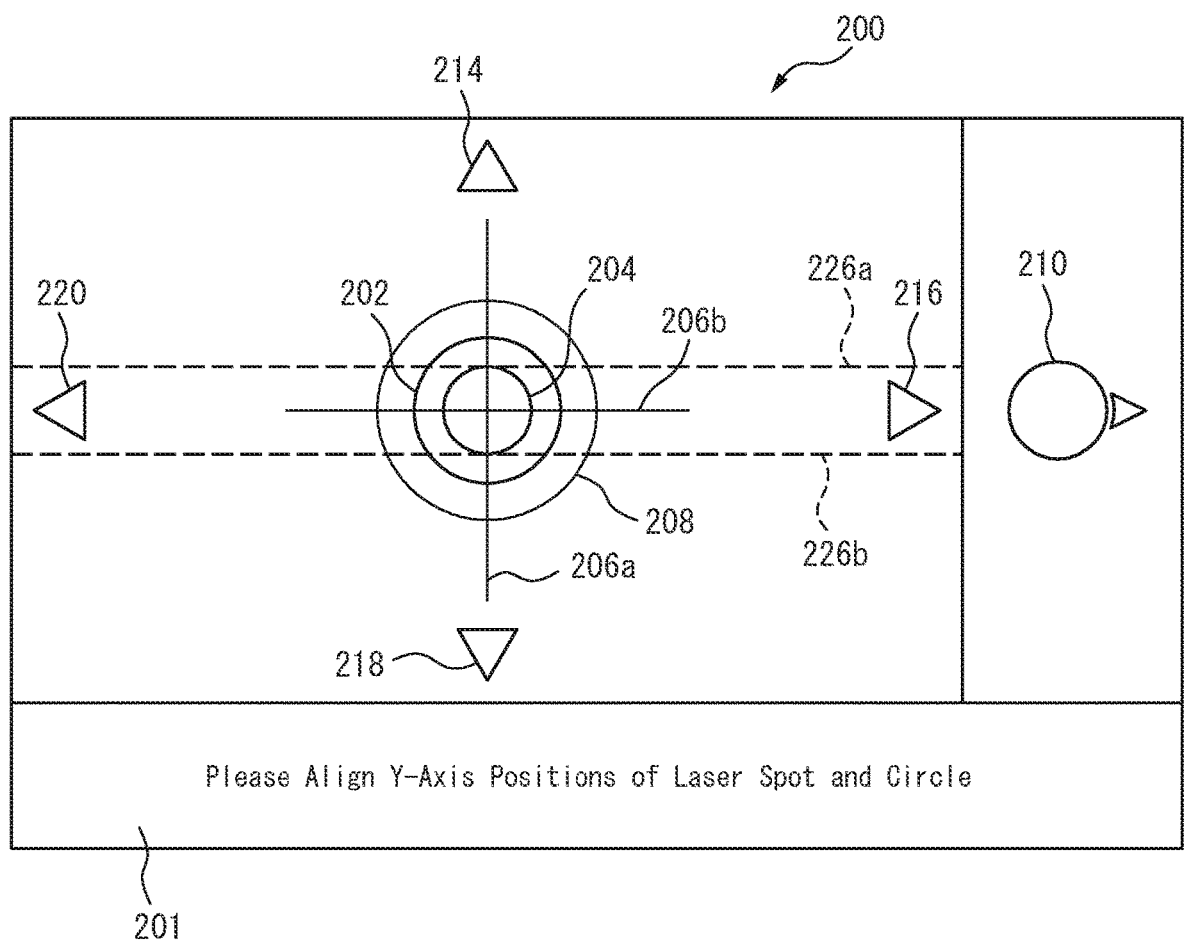

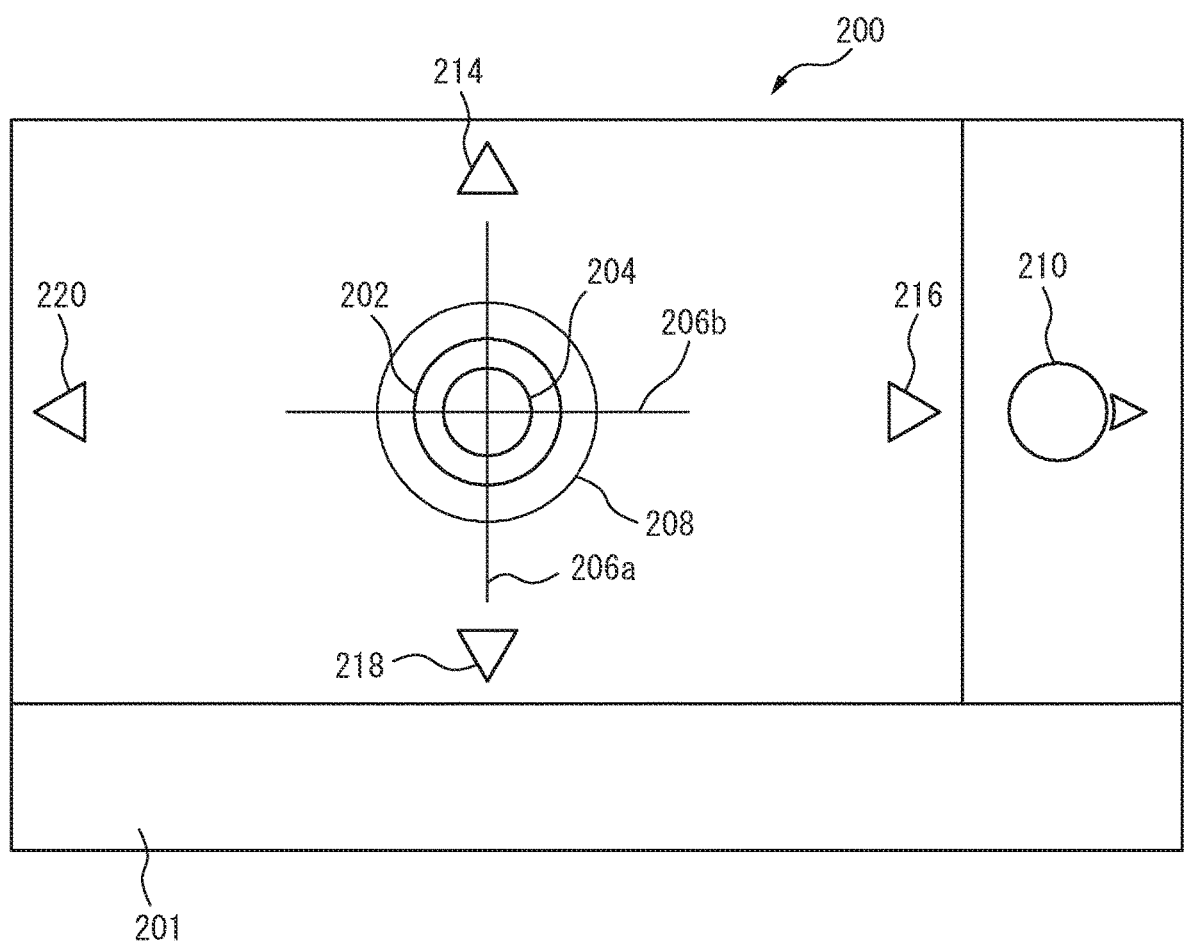

LASER BEAM MACHINE AND ALIGNMENT ADJUSTING METHOD

CROSS-REFERENCE TO RELATED APPLICATION

This application is a U.S. National Stage patent application of International Patent Application No. PCT/JP2015/052755, filed Jan. 30, 2015, which is hereby incorporated by reference in the present disclosure in its entirety.

FIELD OF THE INVENTION

The invention relates to a laser beam machine and an alignment adjusting method therefor, the laser beam machine being configured to machine a workpiece by directing the laser beam through a liquid flow in the form of a pillar formed by a liquid discharged through a nozzle, wherein the laser beam machine has an alignment adjusting function for aligning the optical axis of the laser beam and the axis of the liquid flow.

BACKGROUND OF THE INVENTION

In a laser beam machine configured to machine a workpiece by directing the laser beam through the pillar-like liquid flow formed by a liquid discharged through a nozzle, the optical axis of the laser beam and the axis of the pillar-like liquid flow must be aligned with each other. Patent Literature 1 discloses a laser beam machine provided with such an alignment adjusting device.

The alignment adjusting device of Patent Literature 1 is configured to move a jet nozzle and an optical fiber relative to each other so as to align the center of an image of the laser beam with the center of an entrance opening of the jet nozzle, based on the images of the entrance opening of the jet nozzle, for discharging a liquid to form a liquid pillar, and the laser beam.

PATENT PUBLICATIONS

Patent Literature 1: JP-A-2011-235347

BRIEF SUMMARY OF THE INVENTION

The laser beam used in laser beam machines is classified in Class 4 of security standard of JIS (Japanese Industrial Standards) C6802 and IEC (International Electrotechnical Commission) 60825-1. In the alignment adjusting device of Patent Literature 1, such laser beam of Class 4 is exposed, and therefore, the laser beam machine must be in an environment in compliant with a safety regulation defined by Class 4, in order to adjust the alignment safely, resulting in a larger factory.

The invention is directed to solve the problem of the prior art, and the objective of the invention is to provide a laser beam machine and alignment adjusting method, which enable to adjust the alignment between the pillar-like liquid flow and the laser beam safely and easily.

In order to achieve the above described object, according to the invention, a laser beam machine for machining a workpiece by irradiating a laser beam to the workpiece mounted to a table, comprising an optical head having a nozzle configure to discharge liquid to form a pillar-like liquid flow, the optical head a laser beam into the nozzle to irradiate, and an alignment adjusting device, having a reflecting plate, disposed to face the optical head, for reflecting the laser beam, and a shielding part disposed around a portion of the reflecting plate, the portion being adapted to reflect the laser, the alignment adjusting device being configure to adjust the incident position and the angle of the laser beam relative to the pillar-like liquid flow is provided.

Further, according to the invention, a method of adjusting the alignment of a laser beam in a laser beam machine for machining a workpiece by irradiating a laser beam to the workpiece mounted to a table from an optical head having a nozzle configure to discharge liquid to form a pillar-like liquid flow, the optical head introducing a laser beam to irradiate, comprising the steps of disposing a reflecting plate so as to face the nozzle of the optical head, enclosing the space between the nozzle and the reflecting plate by a shielding member configured to prevent a leakage of the laser beam, irradiating the laser beam toward the reflecting plate, and moving the position of the focal position of the laser beam so as align the optical axis of the laser beam reflected by the reflecting plate with the center of the nozzle is provided.

According to the invention, the reflecting plate, configured to reflect the laser beam, is disposed to face the optical head, and the shield member is disposed around the portion, adapted to reflect the laser beam, of the reflecting plate, and therefore when adjusting the alignment, the laser beam leakage is prevented. Thus, in the laser beam machine of the invention, the alignment adjustment can be carried out in an equipment environment according to less dangerous Class 1, while in the prior art, the alignment adjustment must be carried out in compliance with Class 4 of JIS C6802 or IEC 60825-1.

BRIEF DESCRIPTION OF THE DRAWINGS

FIG. 2 is a schematic section of the optical head and the alignment unit, similar to FIG. 1, wherein the optical head is apart upwardly from the alignment unit, and the laser beam is not irradiated.

FIG. 14 is a schematic illustration, similar to FIG. 8, showing an example of a window for teaching an operator a step of adjusting the Y-axis position of the laser spot.

FIG. 15 is a schematic illustration, similar to FIG. 8, showing an example of a window when the alignment adjustment is completed.

DETAILED DESCRIPTION OF THE INVENTION

With reference to the attached drawings, a preferred embodiment of the invention will be described below.

Figure 7:
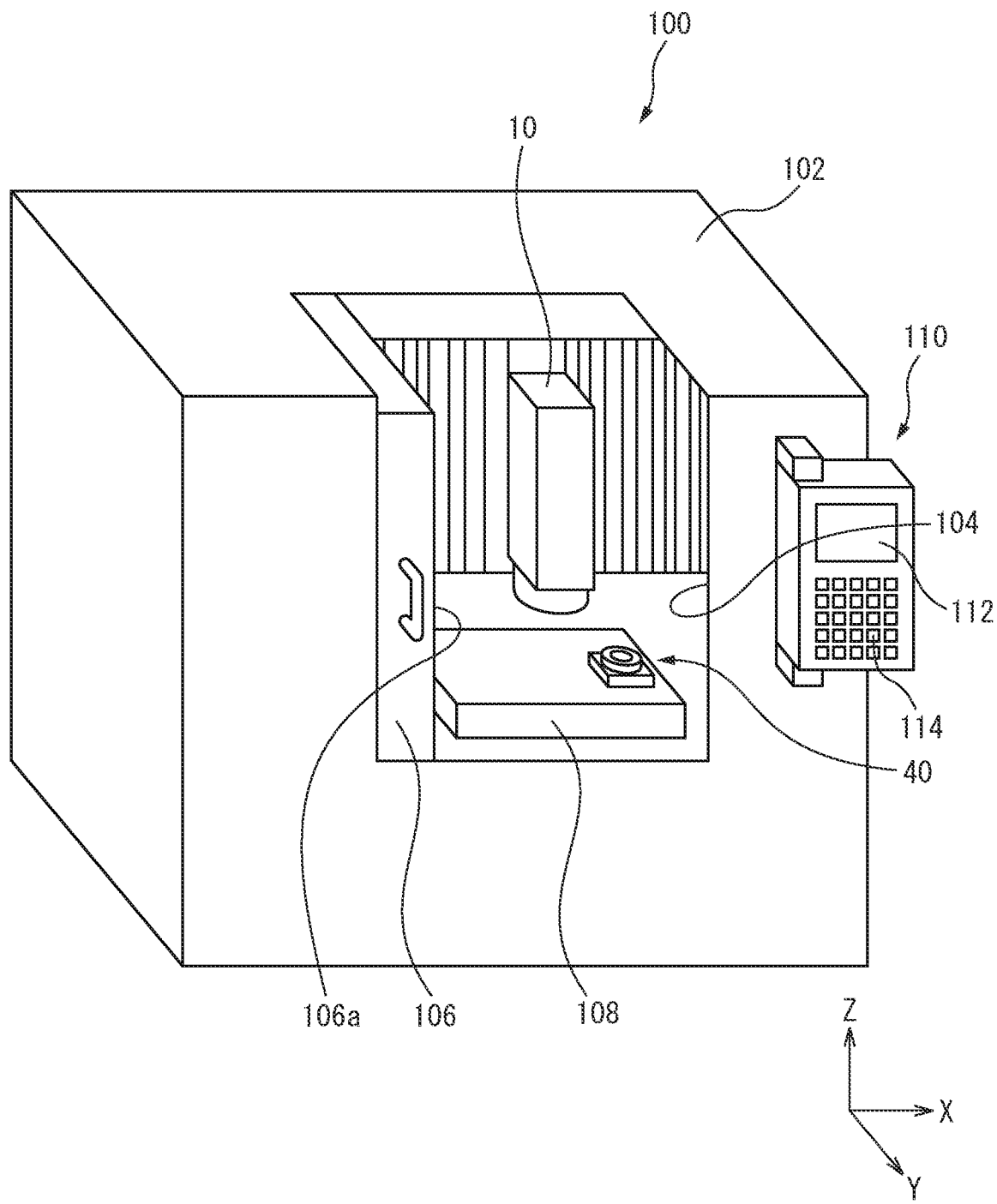
FIG. 7 is a perspective view of an example of a laser beam machine to which the invention is applied.

With reference to FIG. 7, showing an example of a laser beam machine to which the invention is applied, a laser beam machine 100 comprises a table 108 to which a workpiece is attached, an optical head 10 configured to move linearly relative to the table 108 in three orthogonal X-, Y- and Z-axes directions. The optical head 10 and the table 108 are enclosed by a cover 102. The cover 102 has a safety door 106, slidable in the right-left direction (X-axis direction). Opening the safety door 106 allows an operator to access the optical head 10 and the table 108 through an opening 104. The safety door 106 is provided with an open-close sensor 106a for detecting the safety door 106 closed. The table 108 is provided with an alignment unit 40 and an intimate-contact detecting device 50 (refer to FIG. 1).

An operating panel 110 for the laser beam machine 100 is mounted to a front side wall of the cover 102. The operating panel 110 has a display 112, adapted to display parameters, indicating the condition and operation of the laser beam machine 100, icons for teaching an operator the operation procedures and so on, and a various operating buttons 114. The display 112 may be a touch panel, adapted to allow an operator to carry out a various operation to the laser beam machine 100 by touching an icon with his (her) finger. Further, the operating panel 110 is incorporated with a controller for controlling the laser beam machine 100 in accordance with the operator's input and a program contained in the controller.

Figure 1:
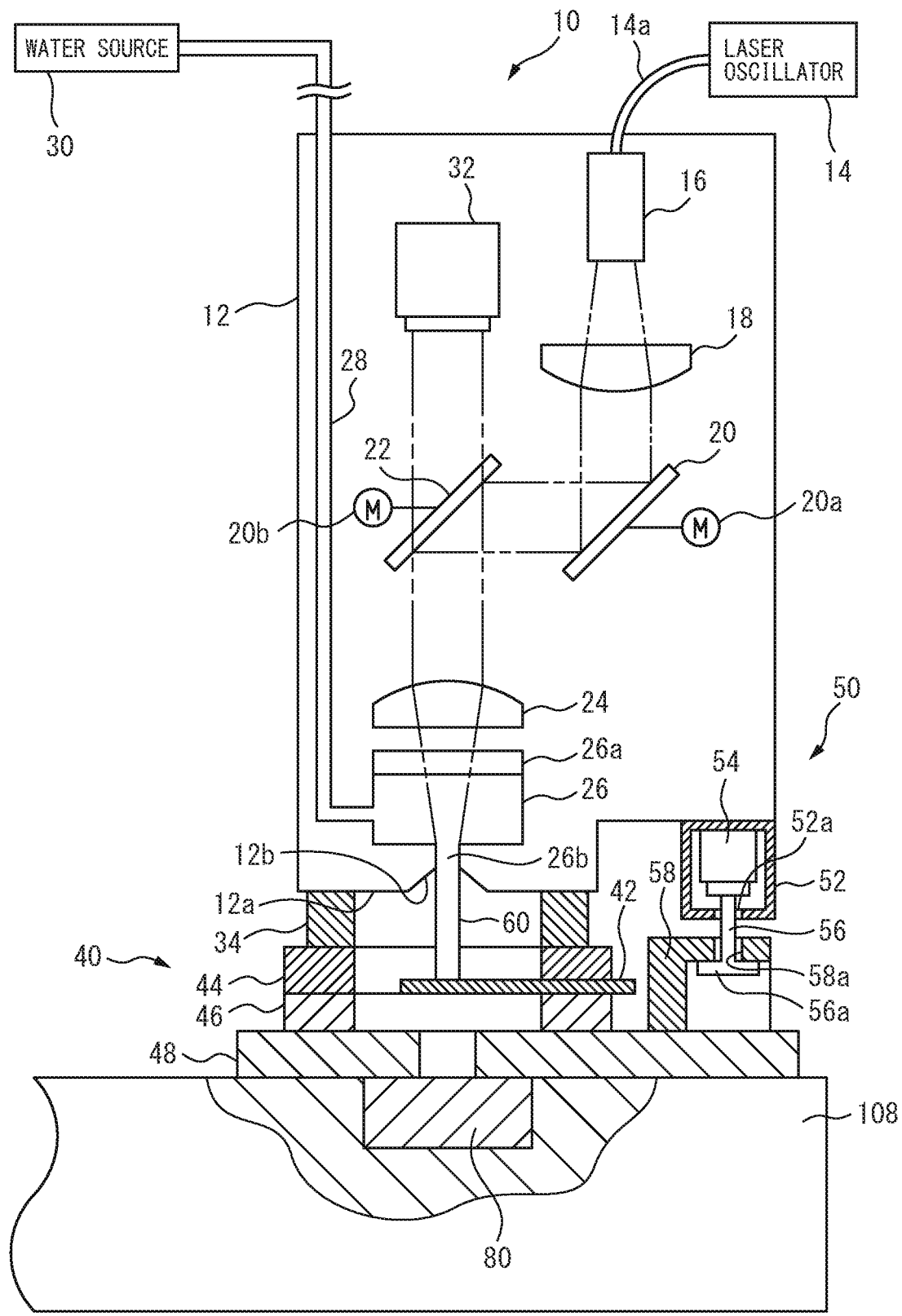
FIG. 1 is a schematic section of an optical head and an alignment unit according to a preferred embodiment of the invention, wherein optical head is positioned at an alignment adjustment position, and the laser beam is irradiated.
Figure 3:
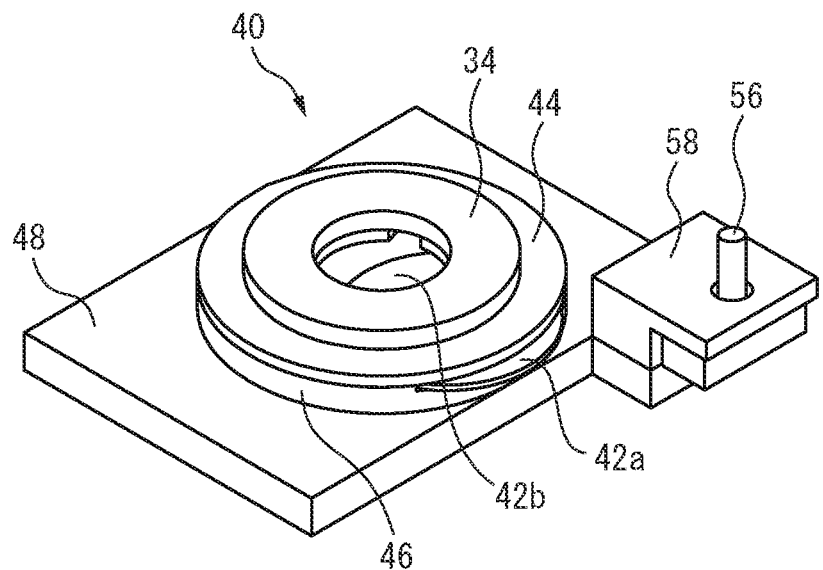
FIG. 3 is a perspective view of the alignment unit.
Figure 4:
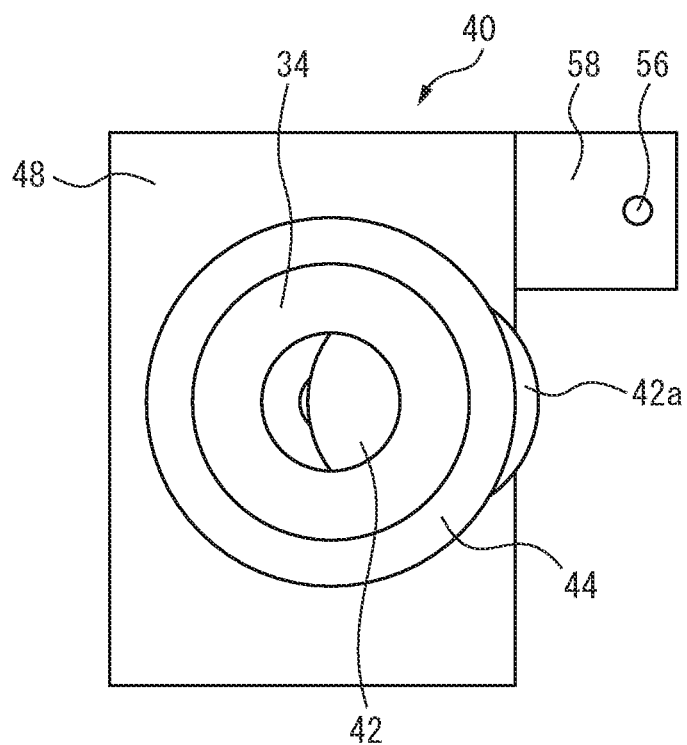
FIG. 4 is a plan view of the alignment unit, showing a reflecting plate positioned at a rotational position for alignment adjustment.

The laser head 10, shown in FIGS. 1 and 2 as an example, comprises a laser irradiation head 16 which is enclosed in a housing 12 and configured to receive the laser beam from a laser oscillator 14 via an optical conduit 14 such as an optical fiber, and to irradiate the laser beam toward a collimation lens 18. The laser beam from the laser irradiation head 16 is parallelized by the collimation lens 18, reflected to a second mirror 22 by a first mirror 20, and reflected toward a focus lens 24 by the second mirror 22. The laser beam is irradiated outside the housing 12 through a nozzle head 26, after being condensed by the focus lens 24. At that time, the optical axis of the laser beam irradiated from the optical head 10 is substantially parallel to the Z-axis.

The first and second mirrors 20 and 22 have planner reflecting surface, and motors 20a and 20b as a mirror orientation adjusting means for adjusting the orientations of the reflecting surfaces (the directions perpendicular to the reflecting surfaces), whereby adjusting the direction of the laser beam irradiated from the optical head 10. The first and second mirrors 20 and 22, in particular the second mirror 22, adapted to reflect the laser beam toward the focus lens 24, include(s) a dielectric multilayer suitable for the wave length of the laser beam irradiated from the laser oscillator 14 to reflect the laser beam and to transmit lights having wave lengths other than the wave length of the laser beam. In particular, it is formed by depositing a dielectric multilayer on a glass plate. Forming the second mirror 22 by such a dielectric multilayer enables the positions of the nozzle 26b and the laser beam irradiated through the nozzle 26 to be monitored by a camera 32.

The nozzle head 26 comprises a tubular member configured to receive water supply from a water source 30 via a conduit 28. Provided in a bottom wall of the nozzle head 26, facing the table 108, is a nozzle 26b for discharging a water jet. Opposite to the bottom wall, a top wall, facing the focus lens 24, is provided with a window 26a formed of a transparent member such as glass. The nozzle 26b is fluidly communicated with the outside of the housing 12 of the optical head 10 via orifice 12b formed in the bottom wall of the housing 12.

The alignment unit 40 is positioned at a position on the table 108 so as to be faced to the optical head 10 by moving the optical head 10 and the table 108 relatively to each other by the three orthogonal X-, Y- and Z-axes feed devices of the laser beam machine 100. The alignment unit 40 comprises a base member 48 configured to be secured to the table 108, an annular lower holding member 46 secured to a top face of the base member 48, an annular upper holding member 44 detachably attached to the lower holding member 46, a reflecting plate 42 held between the upper and lower holding members 44 and 46, and an annular light shielding member 34 fixed to a top face of the upper holding member 44.

The light shielding member 34 is made of a light-impermeable material regarding the laser beam irradiated from the optical head 10. The shielding member may be formed of a material, for example a synthetic resin sponge or a foamed rubber, which can intimately contact with the bottom face 12a of the housing 12 of the optical head 10 so as not to form a gap, allowing a light leakage, between the shielding member 34 and the optical head 10.

The reflecting plate 42 may be formed of for example stainless steel, and is circumferentially rotatably held between the upper and lower holding members 44 and 46. As shown in FIGS. 3-6, when held between the upper and lower holding members 44 and 46, the reflecting plate 42 is positioned so that a portion 42a thereof projects out of the upper and lower holding member 44 and 46, facilitating an operator to rotate the reflecting member 42. At that time, a portion 42b, diametrically opposite to the part 42a, is positioned on the optical axis of the optical head 10. Further, the reflecting plate 42 includes a radially extending cutout part 42c, disposed on the outer periphery, and a flat part 42d, which is disposed diametrically opposite to the cutout part 42c, and is formed by flatting a portion of the outer periphery perpendicularly relative to the radial direction.

Figure 5:
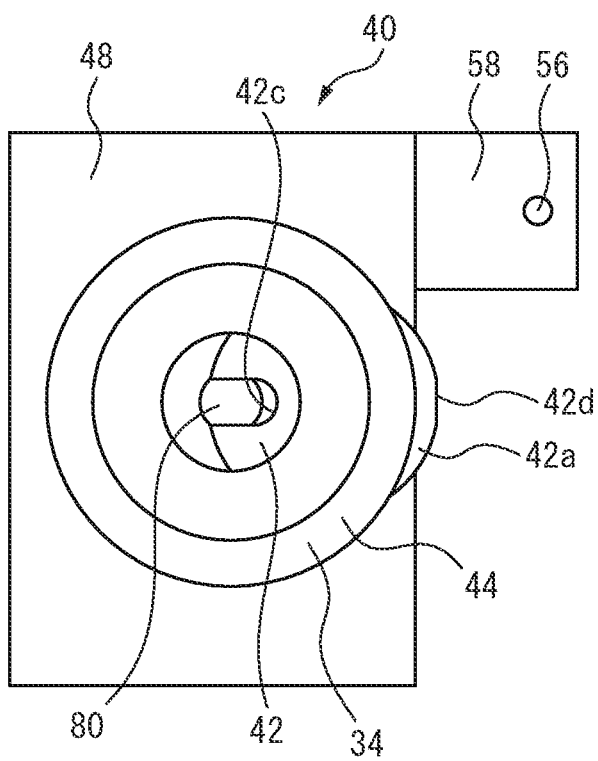
FIG. 5 is a plan view of the alignment unit, similar to FIG. 4, showing the reflecting plate positioned at a rotational position for measuring the output power of the laser beam.
Figure 6:
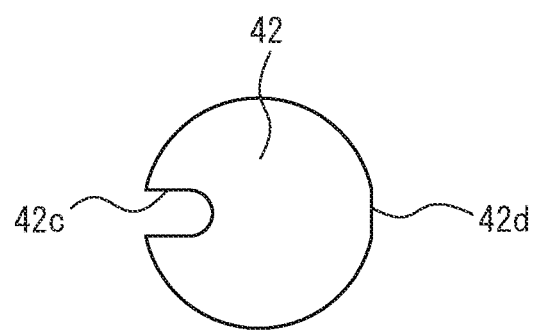
FIG. 6 is a plan view of the reflecting plate.

Further, embedded in the table 108 of the laser beam machine 100 is a output power meter 80 having a sensor part which is disposed on the optical axis of the laser beam irradiated by the optical head 10, which is positioned at an alignment adjustment position, whereby measuring the power of the laser beam irradiated from the optical head 10. As shown in FIG. 5, rotating the reflecting plate 42 to position the cutout part 42c of the reflecting plate 42 on the optical axis of the laser beam allows the output power of the laser beam to be measured. At that time, an operator can position the cutout part 42c based on the position of the flat part 42d disposed diametrically opposite to the cutout part 42c.

The intimate-contact detecting device 50 is a device for detecting that the bottom face of the housing 12 of the optical head 10 intimately sufficiently contacts as shown in FIG. 1, and comprises an interlock switch 54 attached to the bottom face of the housing 12, a switch cover 52 enclosing the interlock switch 54, a pin 56 disposed to enter the switch cover 52 through an opening 52a formed in a bottom face of the switch cover 52. The pin 56 is oriented in the Z-axis direction in this embodiment, and accommodated within a pin cover 58 secured to the table 108. Incidentally, the power meter 80 may be embedded in the base member 48 of the alignment unit 40, instead of the table 108.

The pin cover 58 comprises a boxlike member having an opening in a side wall 58b, allowing an operator to access the inside of the pin cover 58 from the outside. Formed in a top wall of the pin cover 58 is an opening 58a through which the pin 56 extends toward the interlock switch 54. The pin 56 has a radially extending flange part 56a provided at a lower end opposite to the interlock switch. In this embodiment, the flange part 56a includes a magnet (not shown), while the pin cover 58 is made of a magnetic material such as iron, etc., so that the flange part 56a can be magnetically attached to the inner surface of the top wall of the pin cover 58.

The operation of the embodiment will be described below.

When the water is supplied to the nozzle head 26 from the water source 30 via conduit 28, the water is discharged through the nozzle 26b, whereby a pillar-like liquid flow (water pillar) 60, extending in the Z-axis direction, is formed. The laser beam from the laser oscillator 14 is transmitted via the optical conduit 14a, the laser irradiate head 16, collimation lens 18 and first and second mirrors 20 and 22 to focus lens 24 concentrating the laser beam, then is irradiated toward the table 108 after passing through the window 26a of the nozzle head 26, the water in the nozzle head 26 and the pillar-like liquid flow 60. In order to bring the laser beam into the pillar-like liquid flow, after concentrated by the focus lens 24, an alignment adjusting operation is carried out to align the laser beam and the pillar-like liquid flow 60 with each other.

When an operator selects alignment adjusting function on the operating panel 110 and presses a start button on the operating panel 110, the optical head 10 starts to be moved to an alignment adjustment position by the X-, Y- and Z-axes feed devices of the laser beam machine 100. The optical head 10 is moved above the alignment unit 40 then lowered along the Z-axis until the bottom face 12a of the housing 12 of the optical head 10 intimately contacts the shield member 34 of the alignment unit 40. Then, the pin 56 of the intimate-contact detecting device 50 abuts the interlock switch 54 to close the interlock switch 54, whereby the controller of the laser beam machine 100 judges that the optical head 10 has reached the alignment adjustment position and stops the Z-axis feed. In this connection, the optical head 10 may be moved to the alignment adjustment position by defining the movement to the alignment adjustment position in a program read by the controller, or by previously teaching the alignment adjustment position to the controller by an operator through a teaching operation.

When the safety door 106 is opened for the alignment adjustment, if the pin 56 does not abut the interlock switch 54, then the controller of the laser beam machine 100 judges that the optical head 10 is not at the alignment position, whereby inhibiting the irradiation of the laser beam, and displaying a warning on the display 110 and/or generating a warning sound. Further, when the optical head 10 is moved to the alignment position, if the optical head 10 is excessively lowered in the Z-axis direction, the pin 56 can be automatically detached from the pin cover 58, since the pin 56 is attached to the pin cover 58 by the magnet of the flange part 56a. Furthermore, if the optical head is located at a position deviated from the alignment position in the X- or Y-axis direction, pin 56 cannot enter the opening 52a of the switch cover 52, whereby being detached from the pin cover 58.

Further, the controller of the laser beam machine 100 stores the alignment position, which is previously taught by an operator, as the coordinates of the respective feed axes of the laser beam machine. Therefore, when the alignment adjustment is carried out with the safety door 106 opened, if the coordinates of the respective feed devices of the laser beam machine are different from the stored alignment adjustment position, the controller of the laser beam machine 100 judges that the optical head 10 is not at the alignment position, whereby inhibiting the irradiation of the laser beam, and displaying a warning on the display 110 and/or generating a warning sound.

Figure 8:
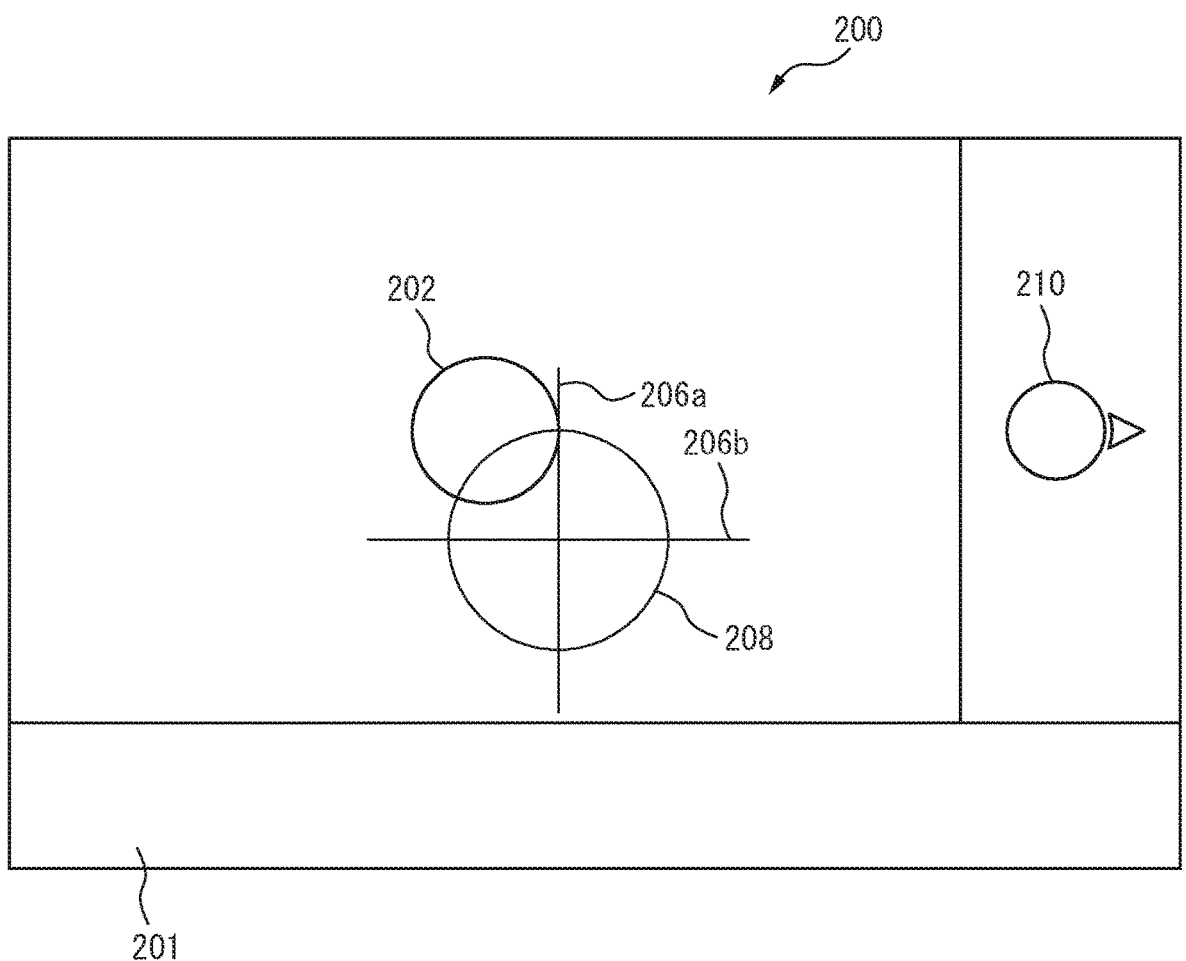
FIG. 8 is a schematic illustration showing an example of a window displayed on a display of the laser beam machine.

After the operator presses a start button on the operating panel 110 to move the optical head 10 toward the alignment adjustment position by the X-, Y- and Z-axes feed devices of the laser beam machine 100, a window 200 is displayed, as shown in FIG. 8, on the display 112 of the operating panel 110. The window 200 includes target circle 208, including a cross lines 206a and 206b, which is generated in the window 200 by the laser beam machine, a text displaying region 201 for displaying a text message for teaching an operator the respective steps of the alignment adjusting method, and a continue icon 210 for allowing an operator to successively proceed with the alignment adjusting operation. The continue icon 210 can be selected after the movement to the alignment adjustment position is completed. Incidentally, the target circle 208 has a diameter larger than that of the nozzle 202.

Figure 9:
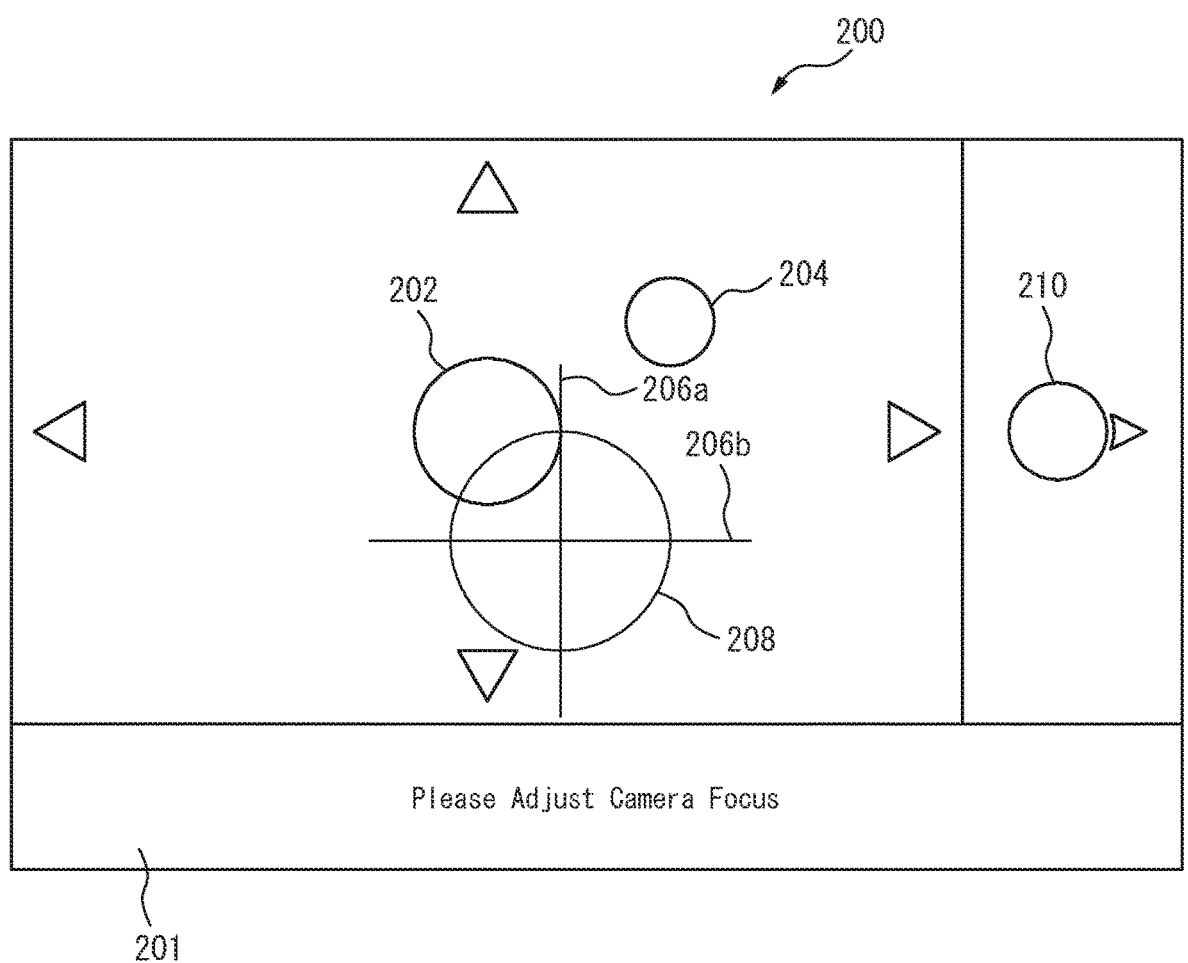
FIG. 9 is a schematic illustration, similar to FIG. 8, showing an example of a window for teaching an operator a step of adjusting the focus of camera.

After the optical head 10 is moved to the alignment adjustment position, the laser beam is irradiated from the optical head 10 with an alignment output power lower than that for machining. At that time, the laser beam is not aligned with the position of the nozzle, and therefore when irradiated, the laser beam is irregularly reflected in the nozzle head 26. A portion of the irregularly reflected laser beam is reflected by the reflecting plate 42 so as to come to the camera 32 through nozzle 26b. Therefore, the contour of the nozzle 26b is displayed on the display 112 as nozzle 202 with the inside bright and the outside dark. In FIG. 9, the optical axis of the laser beam is not aligned with the center of the nozzle 202, and the reflection of the laser beam on the inner wall of the nozzle head 26 is shown as a laser spot 204. Then, when an operator taps the continue icon 210, a text message, "Please Adjust Camera Focus", for instructing the operator to adjust the focus of the camera is displayed in the text displaying region 201 of the window 200, as shown in FIG. 9. In this connection, it should be noted that an operator must access the optical head 10 in order to adjust the focus of the camera 32, and therefore, if the shield member 34 is not provided, then the operator may be exposed to the laser beam.

Figure 10:
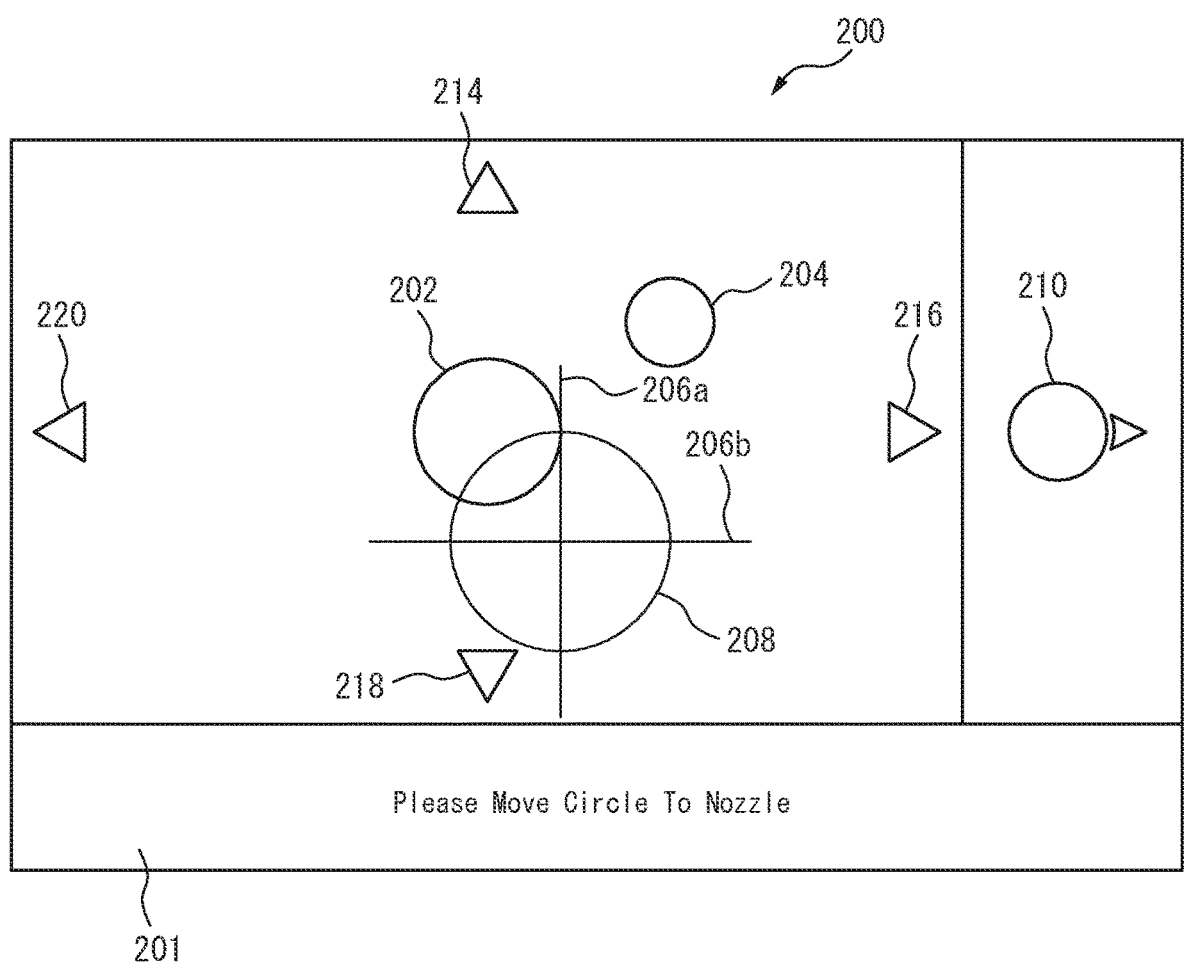
FIG. 10 is a schematic illustration, similar to FIG. 8, showing an example of a window for teaching an operator a step of aligning a target circle and a nozzle with each other.

When the operator taps the continue icon 210, a text message, "Please Move Circle To Nozzle" for instructing the operator to align the target circle 208 and the nozzle 202 is displayed in the text displaying region 201 of the window 200, as shown in FIG. 10. When the operator taps moving icons 214, 216, 218 and 220, the target circle 208 moves, along with the cross lines 206a and 206b, in the direction indicated by each of the moving icons 214-220.

Figure 11:
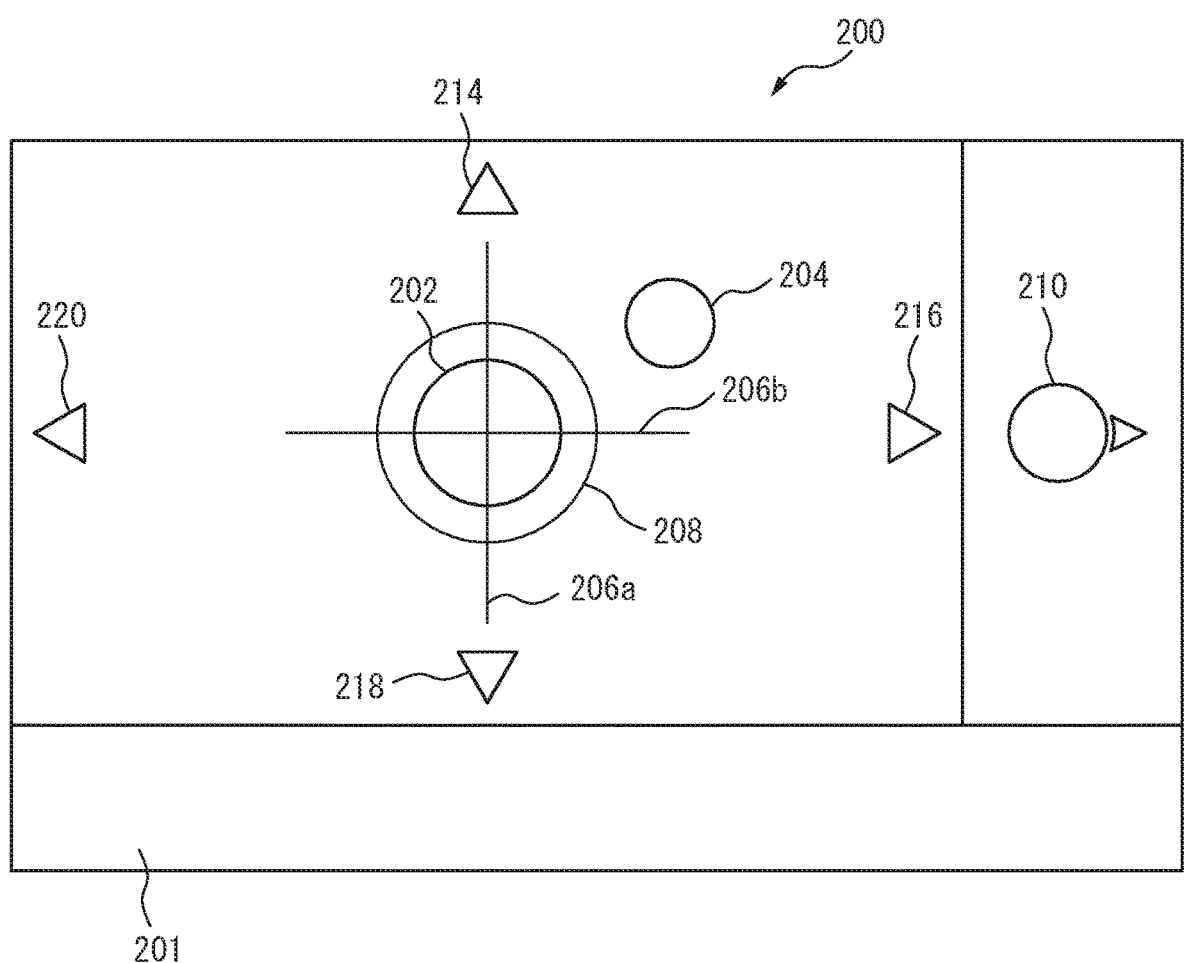
FIG. 11 is a schematic illustration, similar to FIG. 8, showing an example of a window wherein the target circle and the nozzle are aligned with each other.
Figure 12:
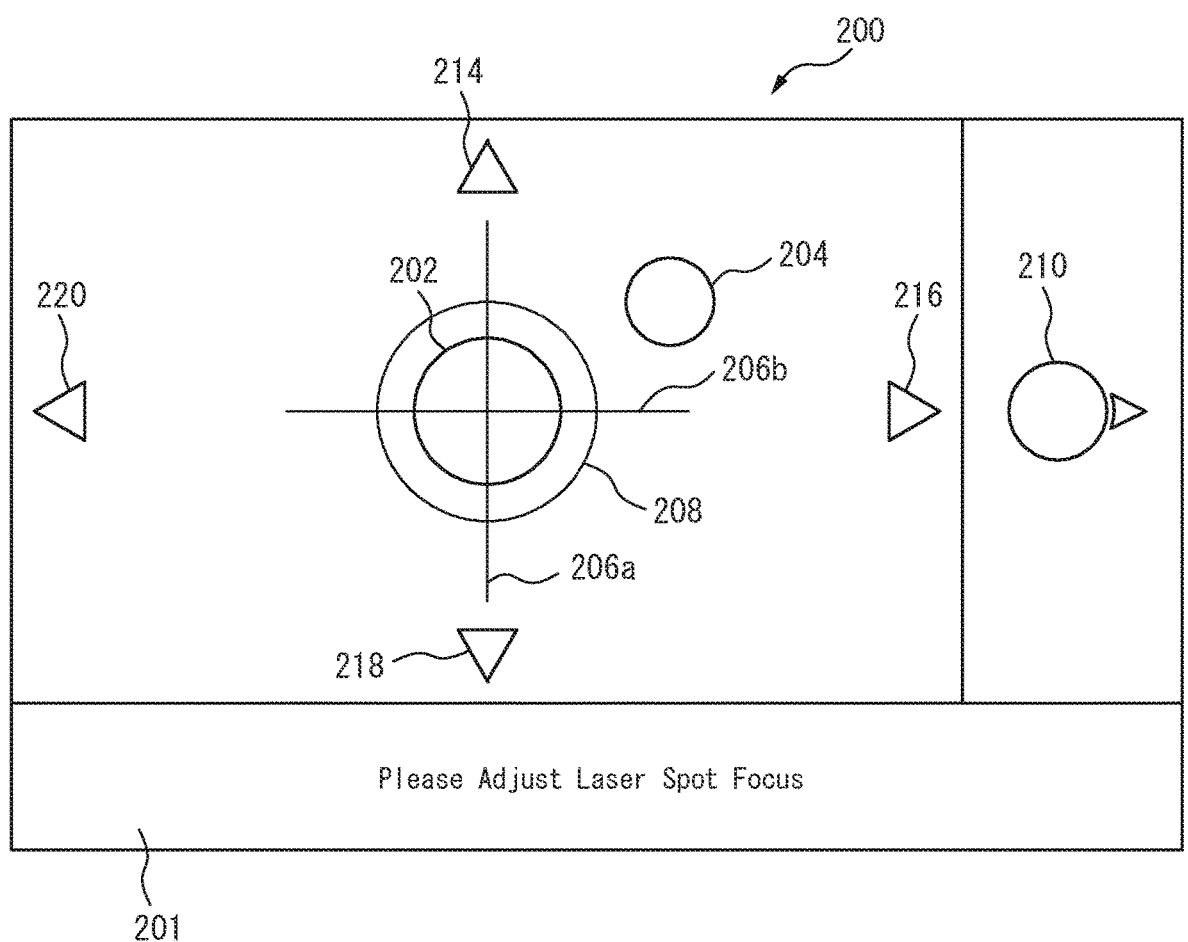
FIG. 12 is a schematic illustration, similar to FIG. 8, showing an example of a window for teaching an operator a step of adjusting the focus of laser spot.

After the target circle 208 is move to a position substantially concentric with the nozzle 202, as shown in FIG. 11, when the operator taps the continue icon 210, a text message, "Please Adjust Laser Spot Focus" for instructing the operator to adjust the focus of the laser beam is displayed in the text displaying region 201 of the window 200, as shown in FIG. 12. The focus of the adjustment of the laser spot is carried out by moving the focus lens 24 in the direction of the optical axis. In order to carry out the operation for moving the focus lens 24, in the prior art, a risk that an operator must access the optical head 10, and therefore in the prior art, the operator may be exposed to the laser beam.

Figure 13:
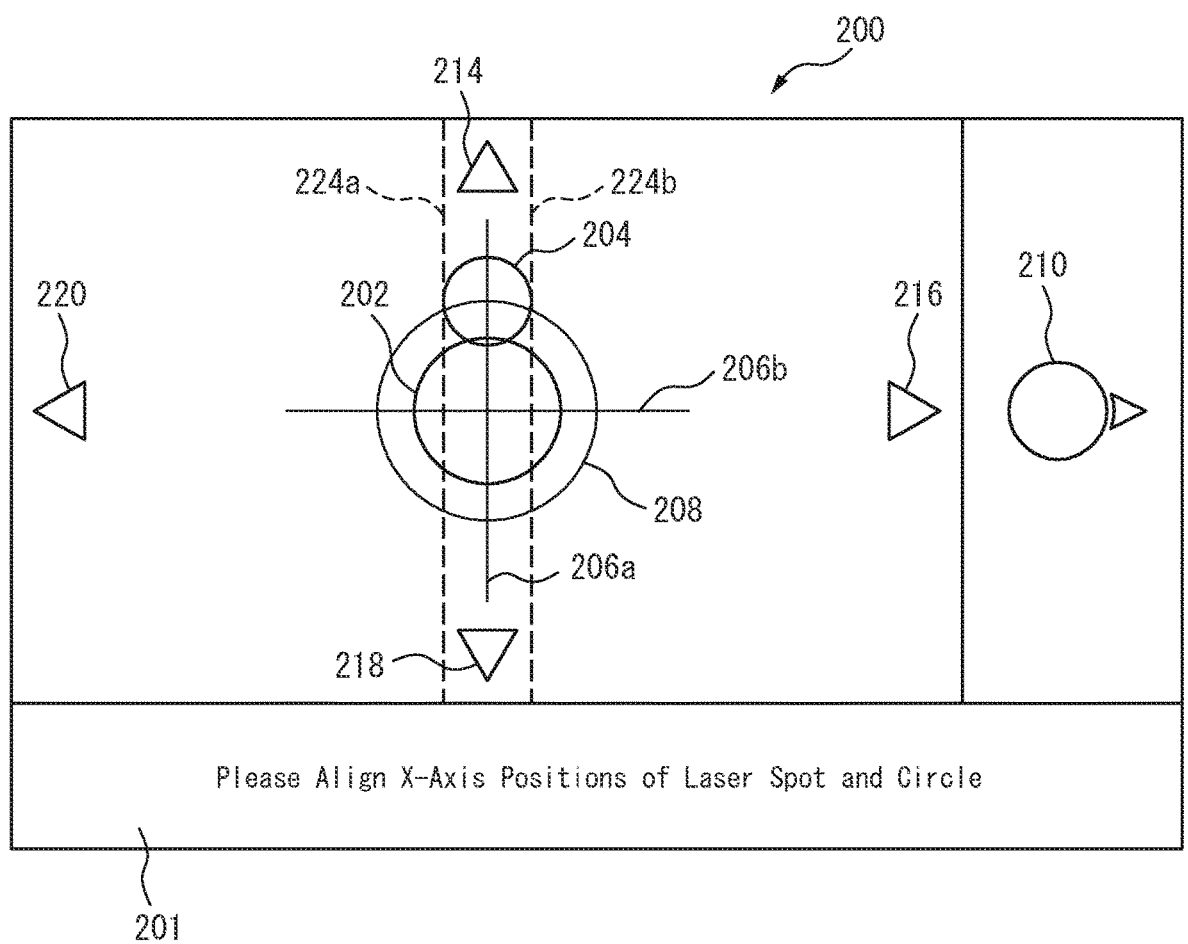
FIG. 13 is a schematic illustration, similar to FIG. 8, showing an example of a window for teaching an operator a step of adjusting the X-axis position of the laser spot.

After the operator adjusts the focus of the laser spot, when the operator taps the continue icon 210, the laser focus icon is disappeared, a text message, "Please Align X-Axis Positions of Laser Spot and Circle" for instructing the operator to position the laser spot 204 in the X-axis direction is displayed in the text displaying region 201 of the window 200, and two vertical auxiliary lines 224a and 224b are displayed at either sides of the vertical (in the Y-axis direction) cross line 206a, as shown in FIG. 13. When the operator taps moving icons 214, 216, 218 and 220, the laser spot moves in the direction indicated by each of the moving icons 214-220. The laser spot is moved by driving the motors 20a and 22a of the first and second mirrors 20 and 22 so as to change the orientation of the first and second mirrors 20 and 22. Accordingly, the incident position or angle of the laser beam is adjusted. The operator can easily position the laser spot 204 in the X-axis direction by locating the laser spot 204 between the auxiliary lines 224a and 224b, indicated by broken lines, as shown in FIG. 13.

After the laser spot 204 is positioned in the X-axis direction, as shown in FIG. 13, when the operator taps the continue icon 210, the vertical auxiliary lines 224a and 224b are disappeared, a text message, "Please Align Y-Axis Positions of Laser Spot and Circle", for instructing the operator to position the laser spot 204 in the Y-axis direction is displayed in the text displaying region 201 of the window 200, and two horizontal auxiliary lines 226a and 226b are displayed at either sides of the horizontal (in the X-axis direction) cross line 206b, as shown in FIG. 14. When the operator taps moving icons 214, 216, 218 and 220, the laser spot moves in the direction indicated by each of the moving icons 214-220. The operator can easily position the laser spot 204 in the Y-axis direction by locating the laser spot 204 between the auxiliary lines 226a and 226b, indicated by broken lines, as shown in FIG. 14. Accordingly, the laser spot 204 is positioned substantially concentrically with the nozzle 202.

Then, when the operator taps the continue icon 210, the horizontal auxiliary lines 226a and 226b are disappeared, and the optical head 10 moves back to the previous position when the above-described alignment adjusting operation was started.

According to the embodiment, the optical head 10 can be surely moved to the alignment adjustment position by controlling with the controller. Further, the respective steps of the alignment adjusting operation procedure, for aligning the axis of the pillar-like liquid flow 60 and the optical axis of the laser beam, are successively displayed on the display 112 of the operating panel 110, whereby preventing an operator from mistaking the operation procedure, and the laser beam being irradiated under unshielded condition, whereby allowing an operator to carry out the operation easily and safely.

Further, according to the embodiment, when the optical head 10 is positioned at the alignment adjustment position, the bottom face of the housing 12 of the optical head 10 contacts intimately with the shielding member 34 to prevent the laser beam being leaked during the alignment adjusting operation. Thus, in the prior art, an alignment adjusting operation must be carried out in compliance with a regulation such as Class 4 of JIS C6802 or IEC 60825-1. In the laser beam machine 100 according to the embodiment, the alignment adjusting operation can be carried out in compliance with class 1, and therefore an operator can be carried out the alignment adjusting operation with the safety door 106 opened.

REFERENCE SIGNS LIST

10 Optical Head
12 Housing
14 Laser Oscillator
16 Laser Irradiation Head
18 Collimation Lens
20 First Mirror
22 Second Mirror
24 Focus Lens
26 Nozzle Head
26a Nozzle
30 Water Source
32 Camera
34 Shielding Member
40 Alignment Unit
42 Reflecting Plate
42c Cutout Part
42d Flat Part
44 Upper Holding Member
46 Lower Holding Member
48 Base Member
50 Intimate-Contact Detecting Device
60 Pillar-like Liquid Flow
100 Laser Beam Machine
108 table
110 Operating Panel
201 Nozzle
204 Laser Spot
208 Target Circle

The invention claimed is:

1. A laser beam machine for machining a workpiece by irradiating a laser beam to the workpiece mounted to a table, comprising:

an optical head having a nozzle configured to discharge liquid to form a pillar-like liquid flow, the optical head introducing a laser beam into the nozzle to irradiate the laser beam; and an alignment adjusting device, having a reflecting plate, disposed to face the optical head, for reflecting the laser beam, an annular shielding member disposed so as to extend around a portion of the reflecting plate, the portion being adapted to reflect the laser, the alignment adjusting device being configured to adjust an incident position and angle of the laser beam relative to the pillar-like liquid flow, wherein the optical head comprises an optical system comprising lenses and mirrors and configured to lead the laser beam from a laser oscillator to the nozzle, a camera configured to capture an image of the nozzle and the reflecting plate, and a housing configured to enclose the optical system and the camera, the nozzle being disposed on a bottom face of the housing, and the alignment adjusting device is disposed in the laser beam machine at a position allowing the shielding member to contact and seal the bottom face of the housing to enclose the nozzle.

2. The laser beam machine according to claim 1, further comprising an intimate-contact detecting device comprising an interlock switch and a pin, and is configured to detect that the housing of the optical head contacts the shielding member when the pin abuts the interlock switch to close the interlock switch.

3. The laser beam machine according to claim 2, further comprising a controller configured to allow the laser beam to be irradiated when the intimate-contact detecting device detects that the housing of the optical head contacts the shielding member.

4. The laser beam machine according to claim 2, further comprising a controller configured to store alignment coordinates composed of respective axial coordinates of a feed device of the laser beam machine at an alignment position in which the housing of the optical head contacts the shielding member, and to allow the laser beam to be irradiated when the intimate-contact detecting device detects that the housing of the optical head contacts the shielding member.

5. The laser beam machine according to claim 1, wherein the alignment adjusting device comprises a base part adapted to be secured to the table, and a holding member formed of an annular member, provided on the base part to hold the reflecting plate, and wherein the shielding member comprises another annular member secured to a top face of the holding member.

6. The laser beam machine according to claim 5, wherein the reflecting plate is rotatably held by the holding member.

7. The laser beam machine according to claim 5, wherein the reflecting plate comprises a circular member defining a cutout part radially extending from the periphery thereof.

8. The laser beam machine according to claim 7, the reflecting plate has a flat part disposed radially opposite to the cutout part.

9. The laser beam machine according to claim 1, further comprising a display for displaying the steps of an alignment adjusting method successively.

* * * * *